(12) United States Patent
Liu

(10) Patent No.: US 12,477,410 B2
(45) Date of Patent: Nov. 18, 2025

(54) CELL RESELECTION METHOD, CELL RESELECTION APPARATUS, AND STORAGE MEDIUM

(71) Applicant: Beijing Xiaomi Mobile Software Co., Ltd., Beijing (CN)

(72) Inventor: Xiaofei Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 425 days.

(21) Appl. No.: 18/004,015

(22) PCT Filed: Jul. 28, 2020

(86) PCT No.: PCT/CN2020/105305
§ 371 (c)(1),
(2) Date: Dec. 30, 2022

(87) PCT Pub. No.: WO2022/021097
PCT Pub. Date: Feb. 3, 2022

(65) Prior Publication Data
US 2023/0180069 A1 Jun. 8, 2023

(51) Int. Cl.
H04W 36/00 (2009.01)
H04W 36/08 (2009.01)

(52) U.S. Cl.
CPC ....... H04W 36/0061 (2013.01); H04W 36/08 (2013.01)

(58) Field of Classification Search
CPC .. H04W 36/0061; H04W 36/08; H04W 48/18
See application file for complete search history.

(56) References Cited

FOREIGN PATENT DOCUMENTS

| CN | 109891924 A | 6/2019 | |
|---|---|---|---|
| CN | 111279741 A | 6/2020 | |
| WO | WO-2017140341 A1 * | 8/2017 | ........ H04W 36/0027 |
| WO | 2019243874 A1 | 12/2019 | |

OTHER PUBLICATIONS

"Slice Availability for Cell (Re-)Selection," Proceedings of the 3GPP TSG-RAN WG2 Adhoc#2, Huawei, HiSilicon, R2-1706775, Revision of R2-1704973, May 27, 2017, Qingdao, China, 4 pages.
"Idle mode behavior for NW slicing," Proceedings of the 3GPP TSG RAN WG2 Meeting #101, ZTE Corporation, Sanechips, R2-1802033, Revision of R2-1800449, Feb. 26, 2018, Athens, Greece, 2 pages.
"Email discussion for R17 proposals on slicing," Proceedings of the 3GPP TSG RAN Meeting #85, CMCC, RP-191778, Sep. 16, 2019, Newport Beach, California, 43 pages.

* cited by examiner

Primary Examiner — Marisol Figueroa
(74) Attorney, Agent, or Firm — McCoy Russell LLP

(57) ABSTRACT

The A cell reselection method includes: determining network slice information, where the network slice information is configured to represent slices supported by each tracking area within one registration area; and performing cell reselection based on the network slice information.

18 Claims, 2 Drawing Sheets

CELL RESELECTION METHOD, CELL RESELECTION APPARATUS, AND STORAGE MEDIUM

CROSS REFERENCE TO RELATED APPLICATION

The present application is a U.S. National Phase of International Application No. PCT/CN2020/105305 entitled "CELL RESELECTION METHOD, CELL RESELECTION DEVICE, AND STORAGE MEDIUM," and filed on Jul. 28, 2020. The entire contents of each of the above-listed applications are hereby incorporated by reference for all purposes.

BACKGROUND

A network slicing technology is introduced into a communication technology network. A network slice is a combination of a plurality of network functions (NFs) and corresponding resources for realizing communication services, including a core network (CN) part, a radio access network (RAN) part and/or a user equipment (UE) part. The communication technology network includes various network slices which meet different connection capacities, one network slice is a logical network which meets demands of communication services of one type or one use case, and different network slices provide differentiated services for different users and different services. The same RAN network can support a plurality of network slices.

After a terminal is registered, a core network allocates one or more tracking areas (TAs) to the terminal, and a registration area (RA) includes the one or more tracking areas allocated to the terminal.

SUMMARY

The disclosure relates to the technical field of communication, in particular to a cell reselection method, a cell reselection apparatus, and a storage medium.

According to a first aspect of an example of the disclosure, a cell reselection method is provided and applied to a terminal, and includes:
determining network slice information, in which the network slice information is configured to represent slices supported by each tracking area within one registration area; and performing cell reselection based on the network slice information.

According to a second aspect of an example of the disclosure, a cell reselection apparatus is provided and includes:
a processor; and a memory configured to store instructions executable by the processor, in which the processor is configured to execute the cell reselection method in the first aspect or any implementation in the first aspect.

According to a third aspect of an example of the disclosure, a non-transitory computer-readable storage medium is provided, and when instructions in the storage medium are executed by a processor of a mobile terminal or a network device, the mobile terminal or the network device can execute the cell reselection method in the first aspect or any implementation in the first aspect.

It needs to be understood that the above general description and the following detailed description are merely examples and illustrative and cannot limit the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

DETAILED DESCRIPTION

Figure 1:
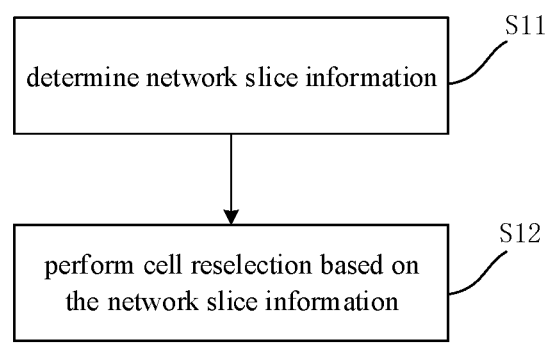
FIG. 1 is a flowchart of a cell reselection method shown according to an example.

The examples will be described in detail here, and their instances are represented in the accompanying drawings. Unless otherwise indicated, when the following description refers to the accompanying drawings, the same number in the different accompanying drawings represents the same or similar elements. Implementations described in the following examples do not represent all implementations consistent with the disclosure. Rather, they are merely instances of an apparatus and method consistent with some aspects of the disclosure as detailed in appended claims.

A network slicing technology is to slice a physical network of communication services into a plurality of virtual networks, each network adapts to different service demands, different networks may be divided through delay, bandwidth, security and reliability so as to adapt to different scenarios. A plurality of logical networks are obtained by slicing an independent physical network through the network slicing technology, so that establishing a dedicated physical network for each service can be avoided, and deployment cost can be reduced.

The network slicing technology is introduced into a communication technology network, the communication technology network includes various network slices which meet different connection capabilities, one network slice is a logical network for meeting demands of communication services of one type or a use case, and the different network slices provide differentiated services for different users and different services. The same radio access network can support a plurality of network slices.

During initial registration, by carrying a non-access stratum (NAS) message through a radio resource control (RRC) message "RRCSetupComplete" IE, a terminal initiates a registration request, and a network slice selection assistance information (NSSAI) request "Requested NSSAI" is carried in the registration request. Requested NSSAI may be network slice selection assistance information configured by a network, namely, "Configured NSSAI", and one terminal may be configured with the plurality of network slices. If the terminal has no configured network slice selection assistance information issued by the network, default network slice selection assistance information, namely, "Default NSSAI" may be used. The radio access network routes NAS signaling to a proper core access and mobility management function (AMF) according to assistance information provided in the radio resource control message by the terminal, and the core access and mobility management function determines allowed network slice selection assistance information and the configured network slice selection assistance information by inquiring a unified data management (UDM) function and a network slice selection function (NSSF). The allowed network slice selection assistance information, the configured network slice selection assistance information and the registration area (RA) are sent to the terminal through registration accept message.

It needs to be understood that in a long term evolution network technology, a core network allocates a tracking area (TA) or a tracking area list composed of a plurality of tracking areas to the terminal. The tracking area is used for describing a general location of the terminal grasped by the core network. A concept of the tracking area is still reserved in the communication technology network, and the registration area in a communication technology is a tracking area list of the long term evolution network, in other words, one registration area includes a plurality of tracking areas.

In the related art, some slices are available merely in a part of the network, and in order to make the terminal rapidly reside on and access to obtain normal services, a cell which supports the terminal to be configured with a specific slice needs to be reselected preferentially for residing on in a cell reselection process. However, different selection priorities cannot be provided for different terminals in a mode of cell broadcast frequency priority. In order to solve the problem, a new radio (NR) R15 adopts a mode of independently configuring the frequency priority for each terminal through dedicated signaling so as to realize the purpose that different terminals select different cells to reside on according to different configured slices.

However, current network slices are unanimously supported in the registration area, namely, the cells in the same registration area support the same slice. As for this case, the communication services can merely deploy different slices for different registration areas, and the flexibility of deployment is poor.

In the related art, within the registration area, network slices supported by each tracking area are consistent, consequently, when communication services need to be implemented, different network slices can merely be deployed for different registration areas, and flexibility is poor.

In order to solve the problem in the related art, the disclosure provides a cell reselection method, a cell reselection apparatus and a storage medium.

There may be a great difference in radio resources and load conditions of different cells in the same registration area, so in the disclosure, according to the difference in the radio resource and the load conditions of the cells, the tracking area is used as a unit, the cell within one tracking area supports one or more same slices, and the cells within the different tracking areas may support one or more different slices. Thus, the disclosure provides a cell reselection method. The priorities of the tracking areas are determined through a relation between the tracking areas and the allowed network slices and/or configured network slices issued by a network supported by the tracking areas, and slice priorities, and further, cell reselection is performed according to the tracking area priorities and a frequency priority.

In the example of the disclosure, the cell reselection method may be applied to various terminals supporting network slices. The terminals may include: a general terminal, an Internet of Things terminal, a vehicle-mounted terminal, or a light terminal.

FIG. 1 is a flowchart of a cell reselection method shown according to an example. As shown in FIG. 1, the cell reselection method is applied to a terminal and includes the following steps.

In step S11, network slice information is determined.

In the example of the disclosure, a network, in response to a registration request sent by the terminal, allocates a registration area to the terminal and sends each tracking area within the registration area and slice information supported by each tracking area. The terminal receives the tracking areas sent by the network and the slice information supported by each tracking area so as to determine the network slice information.

It needs to be noted that the network slice information is configured to represent slices supported by each tracking area within one registration area. Within one registration area, the slices supported within one tracking area are the same, and situations of arranging slices within the different tracking areas include at least one of:

the slices supported within the different tracking areas are the same;

the slices supported within the different tracking areas are different; or the slices supported within the different tracking areas are not completely the same.

In other words, the plurality of tracking areas within one registration area may support the same slices or support the different slices. Besides, the network slice information may also be called network slice selection assistance information.

In step S12, cell reselection is performed based on the network slice information.

In the example of the disclosure, the terminal determines priorities of all the tracking areas within the registration area according to the obtained network slice information, and cell reselection is performed according to the determined priorities of the tracking areas. There are tracking areas with different slices, so the tracking area priorities of all the tracking areas may be determined according to the slice priorities supported by the tracking areas, and further, as for different terminals, the corresponding tracking area priorities of cell reselection may be determined according to different network slices needed by the different terminals and their priorities. The flexibility of slice deployment is improved.

Technical solutions provided by the examples of the disclosure may include the following beneficial effects: according to the disclosure, at least one different slice is arranged in one registration area, the terminal may perform cell reselection according to the network slice information, and the flexibility of network slice deployment is further improved.

Determining the tracking area priorities is described below with reference to an example.

A core network, in response to the registration request of the terminal, carries the slice information supported by the tracking areas within the registration area in a registration accept message to provide for the terminal or to provide for the terminal by means of other non-access stratum messages other than the registration accept message. In an implementation of the disclosure, the terminal determines the priorities of the slices supported by the tracking areas according to the received slice information supported by the tracking areas within the registration area and received slice priority information, and determines a tracking area priority of each tracking area according to the priorities of the slices supported by the tracking area. Besides, the higher the priorities of the slices supported by the tracking area are, the higher the tracking area priority of the corresponding tracking area is. In other words, the tracking area priorities of the tracking areas are determined based on the slices priorities supported by the tracking areas.

In another implementation, for convenient distinguishing, the disclosure calls a configured and/or allowed slice a first network slice, and the first network slice includes one or more slices. The terminal determines the slices among the slices supported by each tracking area which are the same as the configured and/or allowed slice and the quantity according to configured and/or allowed network slice information sent by the network.

In response to determining that there is one or more slices supporting the configured and/or allowed slice among the slices supported by the tracking areas, a priority of a tracking area supporting a first network slice is higher than a priority of a tracking area not supporting the first network slice. Moreover, in the plurality of slices supporting the configured and/or allowed slice among the slices supported by the tracking areas, a priority of a tracking area with higher slice priority is higher than a priority of a tracking area with lower slice priority. In response to determining that there is no slice supporting the configured and/or allowed network slice among the slices supported by a tracking area, a priority of the tracking area is lowest.

Further, in the tracking area supporting the first network slice, the priority of the tracking area is further determined according to the priorities of the slices. For example, one tracking area supports a plurality of configured and/or allowed network slices, a priority of the tracking area is determined according to a slice a priority of which is highest among the supported plurality of configured and/or allowed network slices. In response to determining that slices with higher priorities still exist in the plurality of tracking areas, the tracking areas supporting the slices with the second-highest priorities are further determined as the tracking areas with high priorities according to the other slices with the second-highest priorities, and so on till the priorities of all the tracking areas are obtained.

The network slice priority information is sent to the terminal through a registration accept message by a core access and mobility management function. The core access and mobility management function may also send the network slice priority information to the terminal in other non-access stratum information of non registration accept message. In another way, the network slice priority information may also be sent by a base station to the terminal through a broadcast message or dedicated signaling.

In the example of the disclosure, the terminal receives frequency information issued by the base station, determines a corresponding cell according to the frequency information, so as to determine a tracking area to which the cell belongs. A tracking area range of cell reselection is obtained based on the tracking area to which the cell belongs, and cell reselection is performed according to the priorities of tracking areas within the tracking area range.

The following examples will describe performing cell reselection according to the tracking area priorities within the tracking area range.

In an example, in response to determining that the determined tracking area range includes merely one tracking area, a corresponding frequency priority of a cell within the tracking area is further determined. A priority of a cell with a high frequency priority is higher than a priority of a cell with a low frequency priority, that is, the cell priorities are ranked from high to low according to the frequency priorities. In a sequence from high to low according to the frequency priorities, a proper cell with best cell quality is selected preferentially among high-priority frequencies for residing on, and in response to determining that there is no proper cell under the high-priority frequencies, a proper cell is searched among low-priority frequencies for residing on.

In another implementation, in response to determining that the determined tracking area range includes a plurality of tracking areas, the priority of each tracking area is received, the tracking areas included within the tracking area range are ranked from high to low according to the priorities of the tracking areas. Based on a priority sequence from high to low of the tracking areas within the tracking area range, ranking is performed one by one from high to low according to the frequency priorities, and a proper cell with best cell quality is selected for residing on.

It needs to be noted that as for cells with different frequency priorities, the priority of the cell which belongs to the tracking area with a high priority is absolutely higher than the priority of the cell which belongs to the tracking area with a low priority. For example, in response to determining that the frequency priority of the cell A is higher than the frequency priority of the cell B, but the priority of the tracking area B to which the cell B belongs is higher than the priority of the tracking area A to which the cell A belongs, the priority of the cell B is higher than the priority of the cell A.

The frequency information of the tracking areas may be provided for the terminal through a broadcast message or dedicated signaling of the base station, or the core network determines the frequency information of the tracking areas, and then carries the frequency information of the tracking areas in the registration accept message or in the other non-access stratum messages other than the registration accept message to provide for the terminal. The frequency information of the tracking areas at least includes frequency information of the tracking area where a serving cell exists, and also includes frequency information of the tracking area adjacent to the tracking area where the serving cell exists.

The frequency priority information may be determined through a broadcast message or dedicated signaling issued by the base station, or determined according to the registration accept message sent by the core network or the other non-access stratum messages other than the registration accept message.

In the cell reselection method provided by the disclosure, under the condition of guaranteeing that a quality of service (QoS) strategy is met and the priority of the tracking area to which the serving cell belongs is high, signal quality measurement of an adjacent cell may be not executed.

In an implementation, for an intra-system intra-frequency cell (intra-freq), if signal quality of a serving cell where the terminal resides is greater than an intra-frequency measurement threshold, namely, Srxlev>SIntraSearchP and Squal>SIntraSearchQ, and a tracking area priority to which the serving cell where the terminal resides belongs is higher than a tracking area priority to which a neighboring cell of the serving cell where the terminal resides belongs, an intra-frequency measurement is not executed. Otherwise, the terminal needs to execute the intra-frequency measurement.

In another implementation, for an intra-system inter-frequency cell (inter-freq) or an inter-system cell (inter-RAT), signal quality of the serving cell where the terminal resides is greater than an intra-system inter-frequency or inter-system measurement threshold, namely, Srxlev>SnonIntraSearchP and Squal>SnonIntraSearchQ, and frequencies of neighboring cells of the serving cell are different, in response to determining that a first preset condition is met, an intra-system inter-frequency or inter-system measurement is not executed.

The first preset condition includes:

a tracking area priority of the serving cell where the terminal resides is higher than tracking area priorities of the neighboring cells of the serving cell. Or, tracking areas of the neighboring cells of the serving cell where the terminal resides are the same as a tracking area of the serving cell, and a frequency priority of the serving cell is higher than frequency priorities of the neighboring cells.

In yet another implementation, for the intra-system inter-frequency cell (inter-freq) or the inter-system cell (inter-RAT), signal quality of a serving cell where the terminal resides is greater than an intra-system inter-frequency or inter-system measurement threshold, namely, Srxlev>SnonIntraSearchP and Squal>SnonIntraSearchQ, and the frequencies of at least two neighboring cells of the serving cell are the same, in response to determining that a second preset condition is met, an intra-system inter-frequency or inter-system measurement is not executed.

The second preset condition includes:

a tracking area priority of the serving cell where the terminal resides is higher than tracking area priorities of the neighboring cells of the serving cell, and the neighboring cells do not belong to a tracking area whose tracking area priority is higher than the tracking area priority of the serving cell and a tracking area whose tracking areas priority is the same as the tracking area priority of the serving cell. Or, the tracking area of the neighboring cells of the serving cell where the terminal resides are the same as the tracking area of the serving cell and do not belong to a tracking area whose tracking areas priority is higher than the tracking area priority of the serving cell, and the frequency priority of the serving cell is higher than the frequency priorities of the neighboring cells.

It can be known according to the above implementation that the cell reselection method provided by the example of the disclosure uses the tracking area as a unit, the different slices are set, and the priorities of the tracking areas are determined through the priorities of the slices. The highest priority of the tracking area is further determined according to the configured slice among the slices of the tracking areas; or the highest priority of the tracking area is determined according to the allowed slice among the slices of the tracking areas. The serving cell where the terminal resides is further selected based on the frequency priorities of the cells, so the terminal rapidly resides on a proper cell, and the flexibility of network slice deployment is improved.

Based on the same concept, an example of the disclosure further provides a cell reselection apparatus.

It can be understood that the cell reselection apparatus provided by the example of the disclosure contains corresponding hardware structures and/or software modules for executing all functions in order to implement the above functions. Combined with units and algorithm steps in all instances disclosed in the example of the disclosure, the example of the disclosure can be implemented in a form of hardware or hardware and computer software combination. Whether a certain function is executed by hardware or by computer software driving the hardware depends on specific applications and design restraint conditions of the technical solutions. Those skilled in the art can use different methods for implementing the described functions as for each specific application, but this kind of implementation is not to be regarded as departing from the scope of the technical solutions of the examples of the disclosure.

Figure 2:
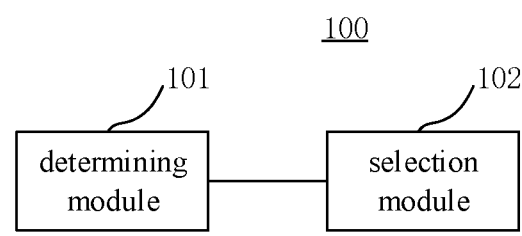
FIG. 2 is a block diagram of a cell reselection apparatus shown according to an example.

FIG. 2 is a block diagram of a cell reselection apparatus 100 shown according to an example. Referring to FIG. 2, the apparatus includes a determining module 101 and a selection module 102.

The determining module 101 is configured to determine network slice information, and the network slice information is configured to represent slices supported by each tracking area within one registration area. The selection module 102 is configured to perform cell reselection based on the network slice information.

In the example of the disclosure, the determining module 101 is further configured to determine tracking area priorities of the tracking areas based on the slices supported by the tracking areas.

The selection module 102 is configured to perform cell reselection based on the tracking area priorities.

In the example of the disclosure, the slices supported by the tracking areas have slice priorities, and the tracking area priorities are determined based on the slice priorities.

In the example of the disclosure, a priority of a tracking area with higher slice priority is higher than a priority of a tracking area with lower slice priority.

In the example of the disclosure, a priority of a tracking area supporting a first network slice is higher than a priority of a tracking area not supporting the first network slice, and the first network slice includes network slices configured by a network and/or network slices allowed by the network.

A tracking area range of cell reselection is determined according to received frequency information, and cell reselection is performed according to the priorities of tracking areas within the tracking area range.

In an implementation, the selection module 102 is configured to perform cell reselection within a tracking area according to a frequency priority in response to the tracking area range includes one tracking area.

In an implementation, the selection module 102 is configured to determine a tracking area of cell reselection according to the priorities of each tracking area within the tracking area range in response to the tracking area range includes a plurality of tracking areas, and performing cell reselection according to a frequency priority within the tracking area.

In the example of the disclosure, the network slice information is determined based on a first message, and the first message is a registration accept message including tracking area network slice information or a non-access stratum message other than the registration accept message.

In the example of the disclosure, the frequency information is determined based on a broadcast message or dedicated signaling sent by a base station; and/or the frequency information is determined based on a first message, where the first message is a registration accept message including tracking area network slice information or a non-access stratum message other than the registration accept message.

In the example of the disclosure, the network slices configured by the network and/or the network slices allowed by the network is determined based on a second message, and the second message is a registration accept message including the configured and/or allowed network slice information or a non-access stratum message other than the registration accept message.

In the example of the disclosure, the frequency priority is determined by a frequency priority issued by a base station; and/or the frequency priority is determined based on a third message, and the third message is a registration accept message including information of network slices configured by a network and/or information of network slices allowed by the network, or a non-access stratum message other than the registration accept message.

Figure 3:
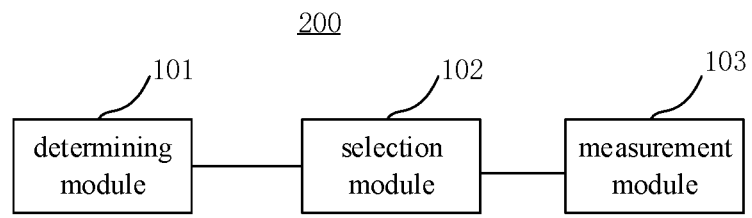
FIG. 3 is a block diagram of a cell reselection apparatus according to an example.

FIG. 3 is a block diagram of a cell reselection apparatus 200 shown according to an example. Referring to FIG. 3, the apparatus includes a measurement module 103.

The measurement module 103 is configured, for an intra-system intra-frequency cell, not to execute an intra-frequency measurement in response to determining that signal quality of a serving cell where the terminal resides is greater than an intra-frequency measurement threshold, and a tracking area priority to which the serving cell where the terminal resides belongs is higher than a tracking area priority to which a neighboring cell of the serving cell where the terminal resides belongs.

The measurement module 103 is configured, for an intra-system inter-frequency cell or an inter-system cell, not to execute an intra-system inter-frequency or inter-system measurement in response to determining that a first preset condition is met, signal quality of the serving cell where the terminal resides is greater than an intra-system inter-frequency or inter-system measurement threshold, and frequencies of neighboring cells of the serving cell are different.

The first preset condition includes:
a tracking area priority of the serving cell where the terminal resides is higher than tracking area priorities of the neighboring cells of the serving cell; or
tracking areas of the neighboring cells of the serving cell where the terminal resides are the same as a tracking area of the serving cell, and a frequency priority of the serving cell is higher than frequency priorities of the neighboring cells.

The measurement module 103 is configured, for an intra-system inter-frequency cell or an inter-system cell, not to execute an intra-system inter-frequency or inter-system measurement in response to determining that a second preset condition is met, signal quality of a serving cell where the terminal resides is greater than an intra-system inter-frequency or inter-system measurement threshold, and frequencies of at least two neighboring cells of the serving cell are the same.

The second preset condition includes:
a tracking area priority of the serving cell where the terminal resides is higher than tracking area priorities of the neighboring cells of the serving cell, and the neighboring cells do not belong to a tracking area whose tracking area priority is higher than the tracking area priority of the serving cell and a tracking area whose tracking areas priority is the same as the tracking area priority of the serving cell; or the tracking area of the neighboring cells of the serving cell where the terminal resides are the same as the tracking area of the serving cell and do not belong to a tracking area whose tracking areas priority is higher than the tracking area priority of the serving cell, and the frequency priority of the serving cell is higher than the frequency priorities of the neighboring cells.

As for the apparatus in the above example, specific modes of executing operations by all modules are already described in the examples related to the method and will not be described here in detail.

Figure 4:
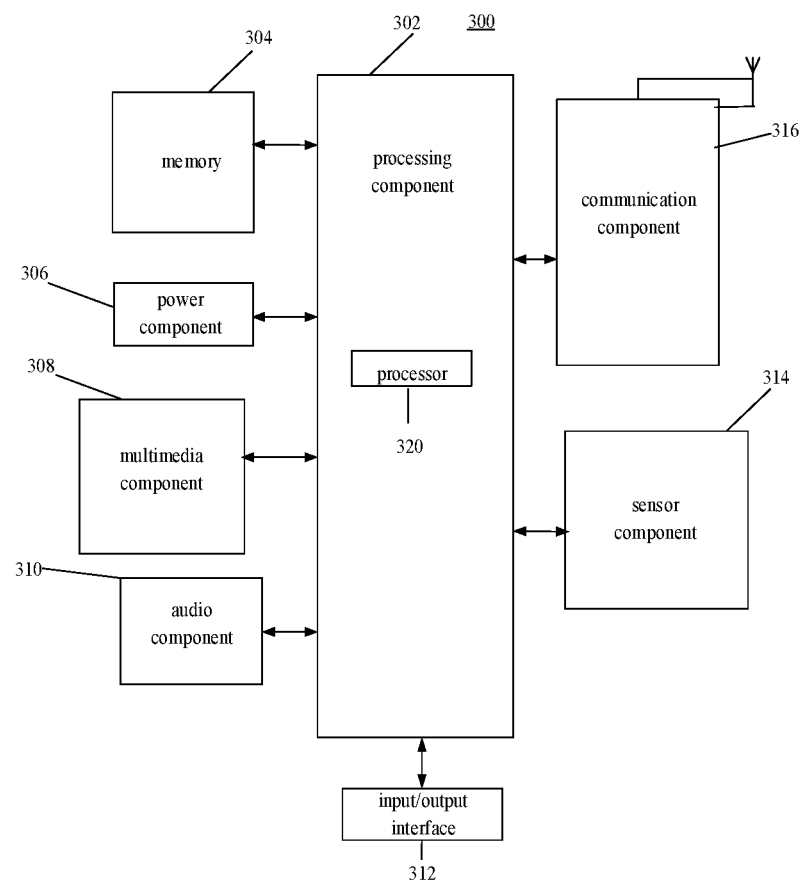
FIG. 4 is a block diagram of a cell reselection apparatus according to an example.

FIG. 4 is a block diagram of an apparatus 300 for cell reselection shown according to an example. For example, the apparatus 300 may be a mobile phone, a computer, a digital broadcast terminal, a messaging device, a game console, a tablet device, a medical device, a fitness facility, a personal digital assistant and the like.

Referring to FIG. 4, the apparatus 300 may include one or more components as follows: a processing component 302, a memory 304, a power component 306, a multimedia component 308, an audio component 310, an input/output (I/O) interface 312, a sensor component 314 and a communication component 316.

The processing component 302 generally controls whole operation of the apparatus 300, such as operations related to display, phone call, data communication, camera operation and recording operation. The processing component 302 may include one or more processors 320 for executing instructions so as to complete all or part of steps of the above method. Besides, the processing component 302 may include one or more modules to facilitate interaction between the processing component 302 and the other components. For example, the processing component 302 may include a multimedia module so as to facilitate interaction between the multimedia component 308 and the processing component 302.

The memory 304 is configured to store various types of data so as to support operations on the apparatus 300. Examples of these data include instructions of any application program or method for operation on the apparatus 300, contact person data, telephone directory data, messages, pictures, videos and the like. The memory 304 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 306 provides power for various components of the apparatus 300. The power component 306 may include a power management system, one or more power sources, and other components related to power generation, management and distribution for the apparatus 300.

The multimedia component 308 includes a screen which provides an output interface between the apparatus 300 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor cannot merely sense a boundary of a touching or swiping action, but also detect duration and pressure related to touching or swiping operation. In some examples, the multimedia component 308 includes a front camera and/or a back camera. When the apparatus 300 is in an operation mode, such as a photographing mode or a video mode, the front camera and/or the back camera can receive external multimedia data. Each front camera and each back camera may be a fixed optical lens system or have a focal length and an optical zoom capability.

The audio component 310 is configured to output and/or input an audio signal. For example, the audio component 310 includes a microphone (MIC). When the apparatus 300 is in the operation mode, such as a call mode, a recording mode and a voice recognition mode, the microphone is configured to receive an external audio signal. The received audio signal may be further stored in the memory 304 or sent via the communication component 316. In some examples, the audio component 310 further includes a speaker for outputting the audio signal.

The I/O interface 312 provides an interface between the processing component 302 and a peripheral interface module, and the above peripheral interface module may be a keyboard, a click wheel, buttons and the like. These buttons may include but are not limited to: a home button, a volume button, a start button and a lock button.

The sensor component 314 includes one or more sensors, configured to provide state evaluation of various aspects for the apparatus 300. For example, the sensor component 314 may detect a start/shut-down state of the apparatus 300 and relative positioning of the components, for example, the components are a display and a keypad of the apparatus 300. The sensor component 314 may further detect location change of the apparatus 300 or one component of the apparatus 300, whether there is contact between the user and the apparatus 300, azimuth or speed up/speed down of the apparatus 300 and temperature change of the apparatus 300. The sensor component 314 may include a proximity sensor, configured to detect existence of a nearby object without any physical contact. The sensor component 314 may further include an optical sensor, such as a CMOS or CCD image sensor, for use in imaging application. In some examples, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may be accessed to a wireless network based on a communication standard, such as WiFi, 2G or 3G, or their combination. In an example, the communication component 316 receives a broadcast signal or related broadcast information from an external broadcast management system via a broadcast channel. In an example, the communication component 316 further includes a near-field communication (NFC) module so as to facilitate short-range communication. For example, the NFC module may be implemented based on a radio frequency identification (RFID) technology, an infra-red data association (IrDA) technology, an ultra-wideband (UWB) technology, a Bluetooth (BT) technology and other technologies.

In an example, the apparatus 300 may be implemented by one or more than one application specific integrated circuit (ASIC), digital signal processor (DSP), digital signal processing device (DSPD), programmable logic device (PLD), field-programmable gate array (FPGA), controller, micro control unit, microprocessor or other electronic elements for executing the above method.

In an example, a non-transitory computer-readable storage medium including instructions is further provided, such as a memory 304 including the instructions. The above instructions may be executed by a processor 320 of an apparatus 300 so as to complete the above method. For example, the non-transitory computer-readable storage medium may be an ROM, a random access memory (RAM), a CD-ROM, a magnetic tape, a floppy disk, an optical data storage device and the like.

It can be further understood that "plurality of" in the disclosure refers to two or more than two, and the other measure words are similar to this. "And/or", which describes an association of associated objects, represents that there may be three relations, for example, A and/or B, which indicates three cases that merely A exists, both A and B exist, and merely B exists. A character "/" generally represents an "or" relation between associated objects before and after the character. A singular form "a/an" and "the" also intends to include a plural form unless other meanings are clearly indicated in the context.

It can be further understood that various information, described with terms such as "first" and "second", should not be limited to these terms. These terms are merely used for distinguishing information of the same type and do not represent a specific sequence or significance. Actually, "first", "second" and the like can be completely interchanged. For example, without departing from the scope of the disclosure, first information may be also called second information, and similarly, the second information may be also called the first information.

It can be further understood that operations, though described in a specific sequence in the accompanying drawings in the examples of the disclosure, are not supposed to be constructed as a requirement for being executed according to a shown specific sequence or a serial order, or a requirement for executing all shown operations to obtain expected results. In a specific environment, multitask and parallel processing are possibly beneficial.

Those skilled in the art will easily figure out other implementation solutions of the disclosure after considering the specification and practicing the disclosure disclosed here. The disclosure intends to cover any transformation, purpose or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It needs to be understood that the disclosure is not limited to an accurate structure described above and shown in the accompanying drawings, and various modifications and changes can be made without departing from its scope. The scope of the disclosure is limited merely by appended claims.

The invention claimed is:

1. A cell reselection method, performed by a terminal and comprising:
   determining network slice information, wherein the network slice information is configured to represent slices supported by each tracking area within one registration area;
   determining tracking area priorities of the tracking areas based on the slices supported by the tracking areas; and
   performing cell reselection based on the tracking area priorities.

2. The cell reselection method according to claim 1, wherein the slices supported by the tracking areas have slice priorities, and the tracking area priorities are determined based on the slice priorities.

3. The cell reselection method according to claim 2, wherein the tracking area priority of a tracking area with higher slice priority is higher than the tracking area priority of a tracking area with lower slice priority.

4. The cell reselection method according to claim 2, wherein the tracking area priority of a tracking area supporting a first network slice is higher than the tracking area priority of a tracking area not supporting the first network slice, and the first network slice comprises network slices configured by a network and/or network slices allowed by the network.

5. The cell reselection method according to claim 1, wherein performing cell reselection based on the tracking area priorities comprises:

determining a tracking area range of cell reselection according to received frequency information, and performing cell reselection according to the tracking area priorities of tracking areas within the tracking area range.

6. The cell reselection method according to claim 5, wherein performing the cell reselection according to the tracking area priorities of tracking areas within the tracking area range comprises:
performing cell reselection within a tracking area according to a frequency priority in response to the tracking area range comprises one tracking area.

7. The cell reselection method according to claim 5, wherein performing cell reselection according to the tracking area priorities of tracking areas within the tracking area range comprises:
determining a tracking area of cell reselection according to the tracking area priorities of each tracking area within the tracking area range in response to the tracking area range comprises a plurality of tracking areas, and performing cell reselection according to a frequency priority within the tracking area.

8. The cell reselection method according to claim 1, wherein the network slice information is determined based on a first message, and the first message is a registration accept message comprising tracking area network slice information or a non-access stratum message other than the registration accept message.

9. The cell reselection method according to claim 5, wherein the frequency information is determined based on a broadcast message or dedicated signaling sent by a base station; and/or
the frequency information is determined based on a first message, wherein the first message is a registration accept message comprising tracking area network slice information or a non-access stratum message other than the registration accept message.

10. The cell reselection method according to claim 4, further comprising:
determining the network slices configured by the network and/or the network slices allowed by the network based on a second message, wherein the second message is a registration accept message comprising the configured and/or allowed network slice information or a non-access stratum message other than the registration accept message.

11. The cell reselection method according to claim 6, wherein the frequency priority is determined based on a broadcast message or dedicated signaling sent by a base station; and/or
the frequency priority is determined based on a third message, wherein the third message is a registration accept message comprising information of network slices configured by a network and/or information of network slices allowed by the network, or a non-access stratum message other than the registration accept message.

12. The cell reselection method according to claim 1, further comprising:
for an intra-system intra-frequency cell, not executing an intra-frequency measurement in response to determining that signal quality of a serving cell where the terminal resides is greater than an intra-frequency measurement threshold, and a tracking area priority to which the serving cell where the terminal resides belongs is higher than a tracking area priority to which a neighboring cell of the serving cell where the terminal resides belongs.

13. The cell reselection method according to claim 1, further comprising:
for an intra-system inter-frequency cell or an inter-system cell, not executing an intra-system inter-frequency or inter-system measurement in response to determining that a first preset condition is met, signal quality of a serving cell where the terminal resides is greater than an intra-system inter-frequency or inter-system measurement threshold, and frequencies of neighboring cells of the serving cell are different; wherein
the first preset condition comprises:
a tracking area priority of the serving cell where the terminal resides is higher than tracking area priorities of the neighboring cells of the serving cell; or
tracking areas of the neighboring cells of the serving cell where the terminal resides are the same as a tracking area of the serving cell, and a frequency priority of the serving cell is higher than frequency priorities of the neighboring cells.

14. The cell reselection method according to claim 1, further comprising:
for an intra-system inter-frequency cell or an inter-system cell, not executing an intra-system inter-frequency or inter-system measurement in response to determining that a second preset condition is met, signal quality of a serving cell where the terminal resides is greater than an intra-system inter-frequency or inter-system measurement threshold, and frequencies of at least two neighboring cells of the serving cell are the same; wherein
the second preset condition comprises:
a tracking area priority of the serving cell where the terminal resides is higher than tracking area priorities of the neighboring cells of the serving cell, and the neighboring cells do not belong to a tracking area whose tracking area priority is higher than the tracking area priority of the serving cell and a tracking area whose tracking areas priority is the same as the tracking area priority of the serving cell; or
the tracking area of the neighboring cells of the serving cell where the terminal resides are the same as the tracking area of the serving cell and do not belong to a tracking area whose tracking areas priority is higher than the tracking area priority of the serving cell, and the frequency priority of the serving cell is higher than the frequency priorities of the neighboring cells.

15. A cell reselection apparatus, comprising:
a processor; and
a memory configured to store instructions executable by the processor, wherein
the processor, when running the executable instructions, is enabled to:
determine network slice information, wherein the network slice information is configured to represent slices supported by each tracking area within one registration area;
determine tracking area priorities of the tracking areas based on the slices supported by the tracking areas; and
perform cell reselection based on the tracking area priorities.

16. A non-transitory computer-readable storage medium, wherein when instructions in the storage medium are executed by a processor of a mobile terminal or a network device, the mobile terminal or the network device is enabled to:
- determine network slice information, wherein the network slice information is configured to represent slices supported by each tracking area within one registration area;
- determine tracking area priorities of the tracking areas based on the slices supported by the tracking areas; and
- perform cell reselection based on the tracking area priorities.

17. The cell reselection apparatus according to claim 16, wherein the slices supported by the tracking areas have slice priorities, and the tracking area priorities are determined based on the slice priorities.

18. The cell reselection apparatus according to claim 17, wherein a priority of a tracking area with higher slice priority is higher than a priority of a tracking area with lower slice priority.

* * * * *